United States Patent [19]
Blandy et al.

[11] Patent Number: 5,940,618
[45] Date of Patent: Aug. 17, 1999

[54] CODE INSTRUMENTATION SYSTEM WITH NON INTRUSIVE MEANS AND CACHE MEMORY OPTIMIZATION FOR DYNAMIC MONITORING OF CODE SEGMENTS

[75] Inventors: Geoffrey Owen Blandy, Austin; Maher Afif Saba, Round Rock; Robert J. Urquhart, Austin, all of Tex.

[73] Assignee: International Business Machines Corporation, Armonk, N.Y.

[21] Appl. No.: 08/935,166

[22] Filed: Sep. 22, 1997

[51] Int. Cl.⁶ .................................................. G06F 9/44
[52] U.S. Cl. ..................... 395/704; 395/703; 395/705; 395/708; 395/709
[58] Field of Search .................. 395/704, 700, 395/463, 425, 670, 701, 705, 708, 709

[56] References Cited

U.S. PATENT DOCUMENTS

| | | | |
|---|---|---|---|
| 5,022,028 | 6/1991 | Edmonds et al. | 371/25.1 |
| 5,121,489 | 6/1992 | Andrews | 395/375 |
| 5,153,886 | 10/1992 | Tuttle | 371/67.1 |
| 5,157,779 | 10/1992 | Washburn et al. | 395/575 |
| 5,212,794 | 5/1993 | Pettis et al. | 395/700 |
| 5,386,547 | 1/1995 | Jouppi | 395/425 |
| 5,410,685 | 4/1995 | Banda et al. | 395/575 |
| 5,452,440 | 9/1995 | Salsburg | 395/463 |
| 5,454,086 | 9/1995 | Alpert et al. | 395/375 |
| 5,533,193 | 7/1996 | Roscoe | 395/183.15 |
| 5,581,696 | 12/1996 | Kolawa et al. | 395/183.14 |
| 5,664,191 | 9/1997 | Davidson et al. | 395/670 |
| 5,689,712 | 11/1997 | Heisch | 395/704 |
| 5,790,858 | 8/1998 | Vogel | 395/704 |

OTHER PUBLICATIONS

"Perturbation Analysis: A Static Analysis Approach for the Non–Intrusive Monitoring of Distributed Programs," 1994 *International Conference on Parallel Processing*, vol. II, pp. 81–88, 1994.

"Towards a Non–Intrusive Approach for Monitoring Distributed Computations through Perturbation Analysis," *Languages And Compilers for Parallel Computing 6th International Workshop Proceedings*, pp. 586–601, Nov. 1993.

Trace Directed Program Restructing for AIX Executables pp. 595–603, Sep. 5, 1994.

Profile Guided Code Positioning. Karl Pettis et al. pp. 16–27, Jun. 22, 1990.

User's Guide for Turbo Pascal by Borland Corporation, pp. 19–38, 101–193, 1988.

Compilers Principles, Techniques and Tools, pp. 703–711, 1985.

*Primary Examiner*—Tariq R. Hafiz
*Assistant Examiner*—Todd Ingberg
*Attorney, Agent, or Firm*—Leslie A. Van Leeuwen; Jeffrey S. LaBaw

[57] ABSTRACT

The present invention is directed to a system and method for monitoring performance in an information handling system in a minimally intrusive manner. The method of the present invention includes a collection phase, a placement phase, and an instrumentation phase. During the collection phase, a workload (i.e. code segment) is traced, and instruction and data accesses are determined. During the placement phase, the trace data is passed to a cache simulator. The cache simulator uses the trace data, along with hardware and instrumentation characteristics, to determine an optimal placement for instrumentation code and data. If the desired conflict level is not attainable, the best possible placement is found by executing the code to be monitored with a variety of instrumentation code and data placements until the least intrusive placement is found. The best possible placement is then used during the instrumentation phase to actually execute the instrumented code.

12 Claims, 5 Drawing Sheets

CODE INSTRUMENTATION SYSTEM WITH NON INTRUSIVE MEANS AND CACHE MEMORY OPTIMIZATION FOR DYNAMIC MONITORING OF CODE SEGMENTS

FIELD OF THE INVENTION

The present invention relates to information processing systems and, more particularly, to software tools and methods for monitoring, modeling, and enhancing system performance.

BACKGROUND OF THE INVENTION

To enhance system performance, it is helpful to know which modules within a system are the most frequently executed. These most frequently executed modules are referred to as "hot" modules. Within these hot modules, it is also useful to know which lines of code are the most frequently executed. These frequently executed code segments are known as "hot spots."

A programmer hoping to improve system performance should focus his or her efforts on improving the performance of the hot modules and hot spots within those modules. Improving the performance of the most frequently executed modules and code segments will have the most effect on improving overall system performance. It does not make sense to spend much time improving the performance of modules or code segments which are rarely executed, as this will have little, if any, effect on the overall system performance.

Many modern processors contain hardware capability which allows performance data to be collected. For example, most modern processors have the capability to measure cycle time. Many modern processors also have the ability to count other items, such as cache misses, floating point operations, bus utilization, and translation look-aside buffer (TLB) misses. To count cache misses, for example, a bit or a sequence of bits within a control register is set to a predetermined code. This bit sequence tells the processor to increment a counter every time there is a cache miss. When the bit sequence is reset, the processor stops counting cache misses, and the total number of cache misses can be read from another register or from a memory area.

Once a programmer determines a code segment (i.e. a hot spot) that needs further performance analysis, the programmer then "instruments" the code to be tested. For example, suppose the programmer determines that a particular code segment, consisting of twenty lines of code, is a hot spot that needs further performance analysis. The programmer will put a "hook" (i.e. an instruction or group of instructions) in front of the twenty instructions. The hook will typically be a jump instruction, causing execution to jump to an instrumentation routine. The instrumentation routine will start some type of performance analysis. For example, the instrumentation routine may set an appropriate bit or set of bits in a control register to turn on cache miss counting in the processor. The instrumentation code then returns control to the instructions being tested. At the end of the code segment being tested, the programmer will insert another hook. This hook typically jumps to an instrumentation routine which turns off performance testing. In the example given, the instrumentation routine would set the appropriate bit or bits in the control register to stop cache miss counting, and then would store the cache miss count.

One problem with this type of instrumentation is that the instrumentation routines may affect the performance results of the code being analyzed. For example, if any of the instructions in the instrumentation routines are in the same cache congruency class as an instruction in the code being tested, an instrumentation instruction could cause a tested instruction to be forced out of the instruction cache. This would affect the cache hit/miss ratio and the cycles per instruction (CPI) measurement for the code being tested. Similar problems could occur with data cache measurements if any data accesses by the instrumentation routine forced data out of the data cache. Similar problems could also occur with other types of measurements, such as translation lookaside buffer (TLB) measurements.

Consequently, it would be desirable to have a minimally intrusive system and method for measuring performance in an information handling system. It would be desirable if the system and method greatly decreased the chance of instrumentation code or data impacting the performance measurements of tested code.

SUMMARY OF THE INVENTION

Accordingly, the present invention is directed to a system and method for monitoring performance in an information handling system in a minimally intrusive manner. The method of the present invention includes a collection phase, a placement phase, and an instrumentation phase. During the collection phase, a workload (i.e. code segment) is traced, and instruction and data accesses are determined. During the placement phase, the trace data is passed to a cache simulator. The cache simulator uses the trace data, along with hardware and instrumentation characteristics, to determine an optimal placement for instrumentation code and data. If the desired conflict level is not attainable, the best possible placement is found by executing the code to be monitored with a variety of instrumentation code and data placements until the least intrusive placement is found. The best possible placement is then used during the instrumentation phase to actually execute the instrumented code.

One embodiment of the present invention is an information handling system capable of performing the method described above. Another embodiment of the present invention is as sets of instructions resident in an information handling system.

One advantage of the present invention is that it allows performance monitoring of code segments with minimal intrusion. Another advantage of the present invention is that it decreases the chance of instrumentation code or data impacting the performance measurements of code being tested.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
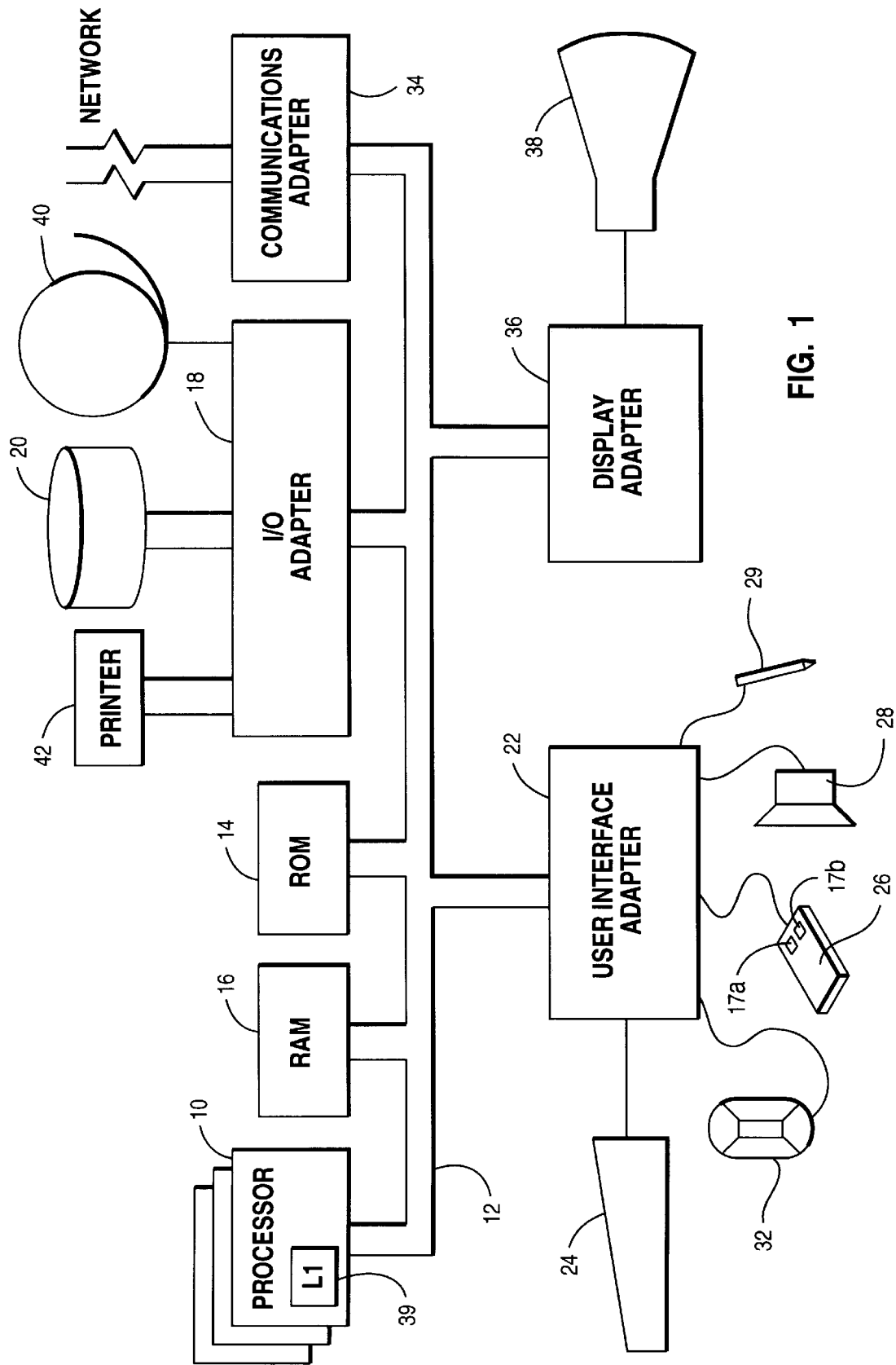
FIG. 1 is a block diagram of an information handling system capable of executing the performance monitoring method of the present invention.

The invention may be implemented on a variety of hardware platforms, including personal computers, workstations, mini-computers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Each processor 10 includes a level one cache memory 39. Additional levels of cache memory may be present in processor 10 or connected to bus 12. Communication adaptor 34 may link the system depicted in FIG. 1 with hundreds or even thousands of similar systems, or other devices, such as remote printers, remote servers, or remote storage units.

It is often desirable to collect the intrinsic data of a certain workload, or code segment, to help identify performance problems within an information handling system. Intrinsic data is data that describes inherent characteristics of the code. For example, a code segment may be written in such a way that it will always cause a cache miss. The cache miss is an inherent characteristic of the code segment. Alternately, a code segment may be written such that it will always cause an interrupt which then causes a cache miss. This type of cache miss is also an inherent characteristic of the code segment. Intrinsic data can be used as input to system design for both hardware and software. For example, data such as the cache miss rate is vital in determining hardware cache geometry, whereas instruction count data is critical for use in compiler optimization.

Two kinds of intrinsic data can be collected, deterministic data and non-deterministic data. Deterministic data includes such things as data access and instruction execution sequences. Usually, external factors, such as interrupts, do not disturb the collection of deterministic data. Non-deterministic data includes such things as cache hit/miss ratios and TLB hit/miss rations, and are much more sensitive to external factors, such as interrupts. The collection and use of non-deterministic data can be inaccurate and misleading, especially when measured over a relatively small workload.

The present invention describes a system and method for collecting intrinsic data of a certain workload, or code segment, while minimizing external factors that affect the validity of non-deterministic data. In particular, a multi-phased method is used to collect instruction and data statistics while minimizing the side effects of the instrumentation code itself.

The present invention may be used to collect data for any size workload, but is particularly useful for instrumenting code segments of approximately 10 instructions up to approximately 200 instructions. For large code segments (i.e. more than 200 instructions), the overhead associated with overwriting instructions or data in the cache, and then moving the same items back into the cache, is a small percentage of total execution time, and thus has a minimal effect on performance measurements. For small code segments (i.e. fewer than ten instructions), the instrumentation is so tight that it is virtually impossible to get an accurate picture of cache usage.

For illustrative purposes, the present invention will be described with reference to collecting instruction and data caching statistics for a code segment. One of the concerns with collecting instruction and data cache information is that the act of collecting the information will affect the measurements. This is because instrumentation code or data may inadvertently be in the same cache congruency class as the code segment instructions or data. A cache congruency class is a class of addresses that have the same mapping into cache.

For example, suppose that a particular piece of data for the code segment being tested can be put into one of four places in the data cache. These four places in the data cache are part of the same cache congruency class. Once all four places are filled with data, a least recently used algorithm is used to determine which piece of data is overwritten the next time a new piece of data needs to be written into the data cache. If instrumentation data is in the same cache congruency class, it is possible that a piece of instrumentation data will overwrite a piece of data that would not normally be overwritten. This will cause a cache miss to occur, which would not normally occur. A similar situation can occur with instructions mapping into the instruction cache. It is possible that instructions from the code being tested could map to the same place in the instruction cache as instrumentation instructions. The system and method of the present invention minimizes these types of mismeasurements by ensuring that the instrumentation code and instrumentation data does not intrude upon the code segment being tested. Of course, one skilled in the art will understand that there will be other optimization advantages associated with the present invention.

Figure 2A:
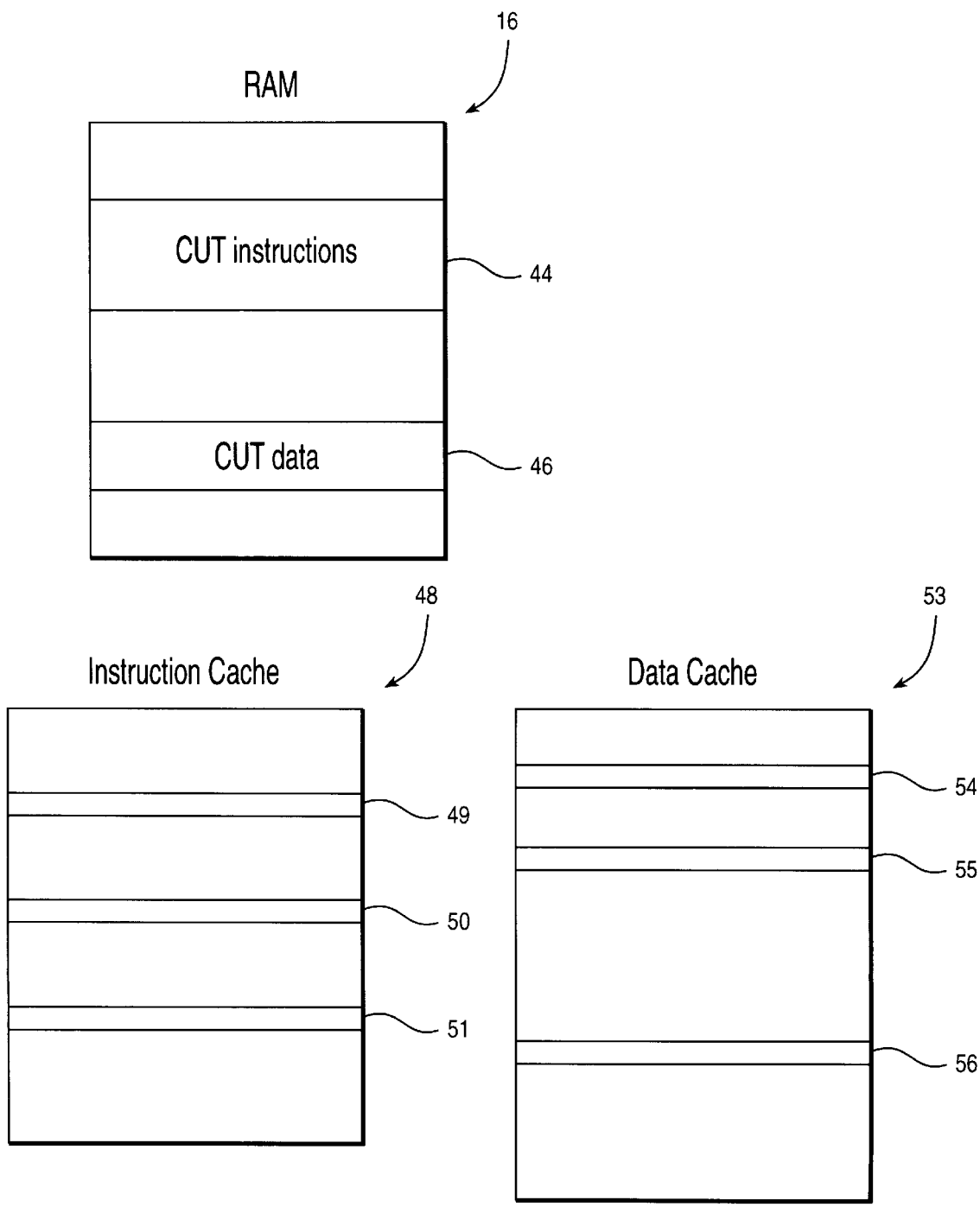
FIGS. 2A and 2B are block diagrams depicting portions of RAM and cache memory in the system of FIG. 1.
Figure 2B:
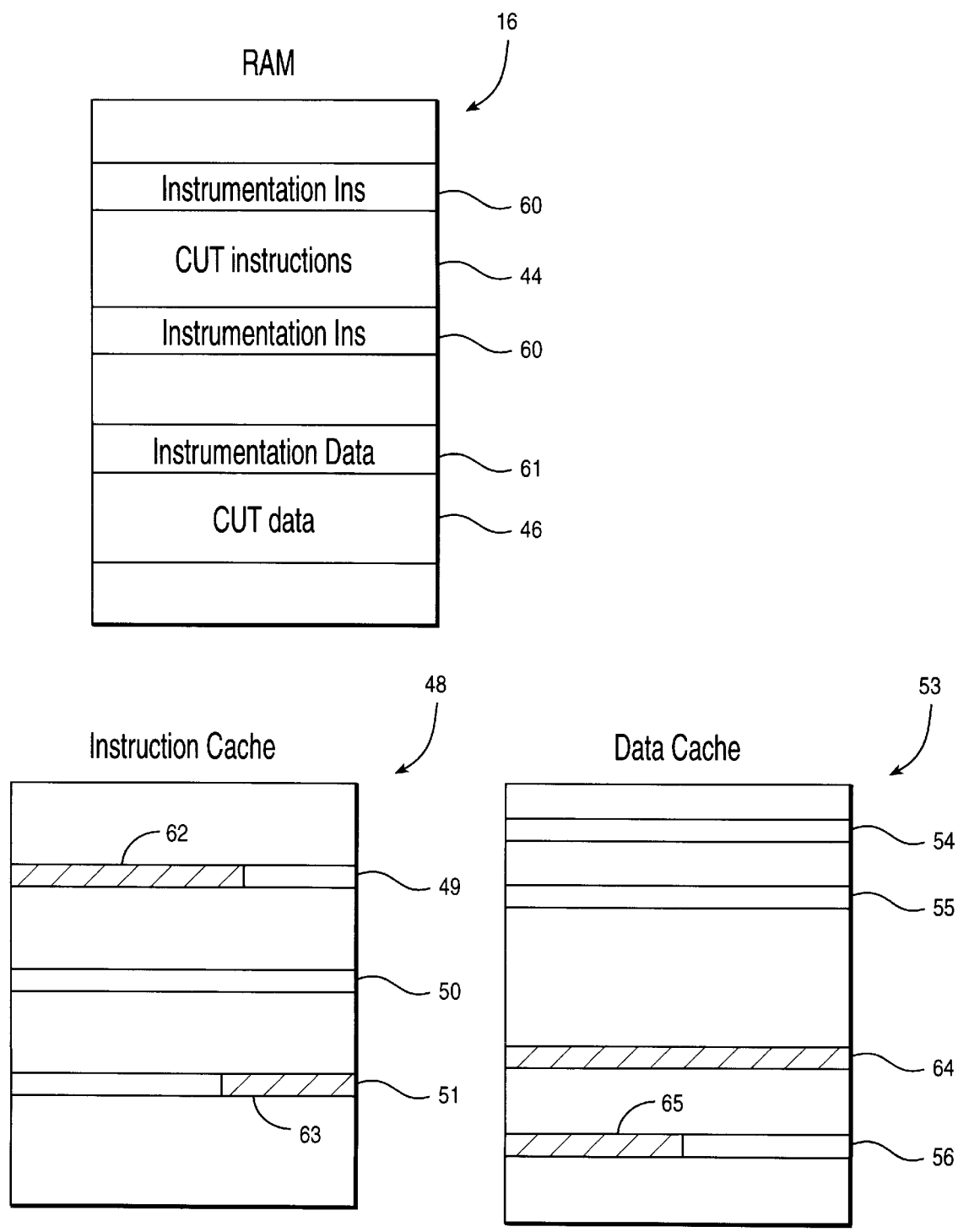

The problems associated with collecting cache miss data are illustrated pictorially in FIGS. 2A and 2B. Code under test (CUT) instructions 44 and CUT data 46 are loaded into RAM 16. CUT instructions 44 map into instruction cache 48 at cache lines 49, 50, and 51. CUT data 46 map into data cache 53 at cache lines 54, 55, and 56. Now suppose that instrumentation instructions and data are loaded into RAM 16 as depicted in FIG. 2B. Instrumentation instructions 60 are loaded before and after CUT instructions 44. Instrumentation data 61 is loaded before CUT data 46. At first glance, it appears that the instrumentation instructions and data do not interfere with the code segment under test. However, a closer look at the instruction and data caches show that the cache hit/miss ratio will be affected by the instrumentation instructions and data. Instrumentation instructions 60 map into instruction cache 48 at locations 62 and 63, partly overwriting cache lines 49 and 51. Similarly, instrumentation data 61 maps into data cache 53 at locations 64 and 65. The mapping to location 64 does not affect CUT data 46. However, the mapping to location 65 partially overwrites cache line 56, and thus will have an effect on the data cache hit/miss ratio. The present invention provides a system and method for minimizing the effect that instrumentation instructions and data have on the performance measurements collected.

Figure 3:
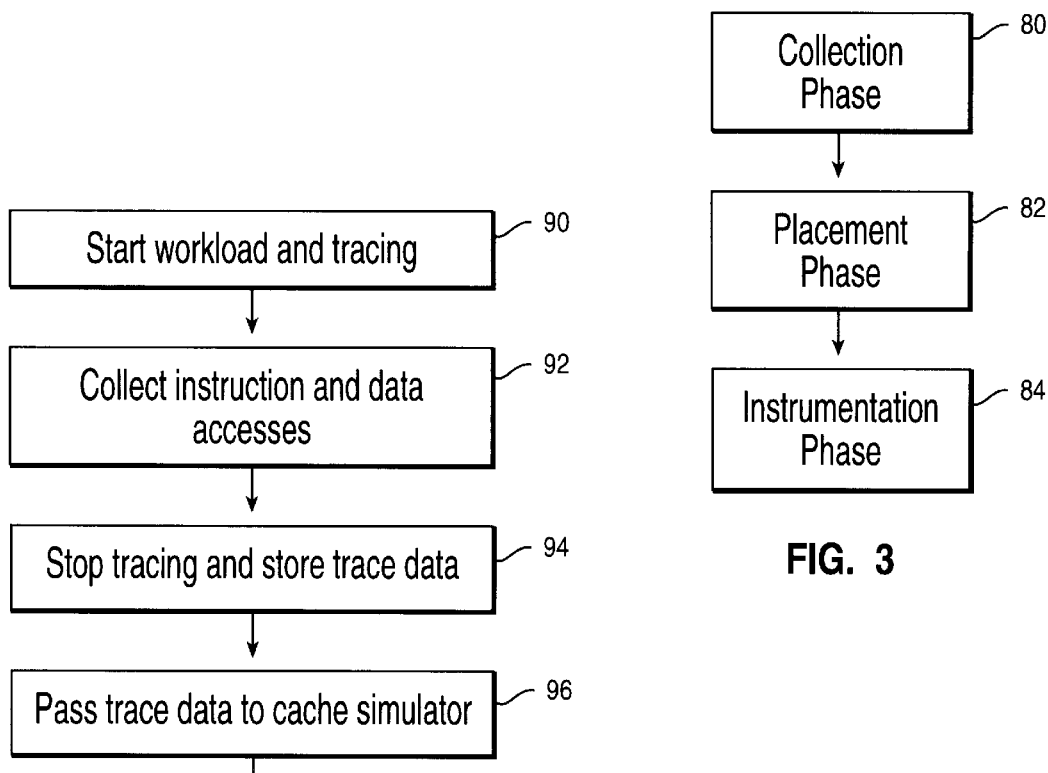
FIG. 3 is a flow chart depicting the multiple phases of the present invention.

In its preferred embodiment, the present invention is carried out in three phases, as depicted in FIG. 3. The first phase is referred to as the collection phase 80. During collection phase 80, data is collected regarding the code to be instrumented, or monitored. This data is then used during the second phase, placement phase 82. During placement phase 82, a determination is made as to where in memory to place instrumentation code segments and data segments so as to have the least effect on the actual code segment being monitored. Finally, during the third phase, instrumentation phase 84, the code to be monitored is executed with the instrumentation code segments and data segments in optimal memory locations.

Figure 4:
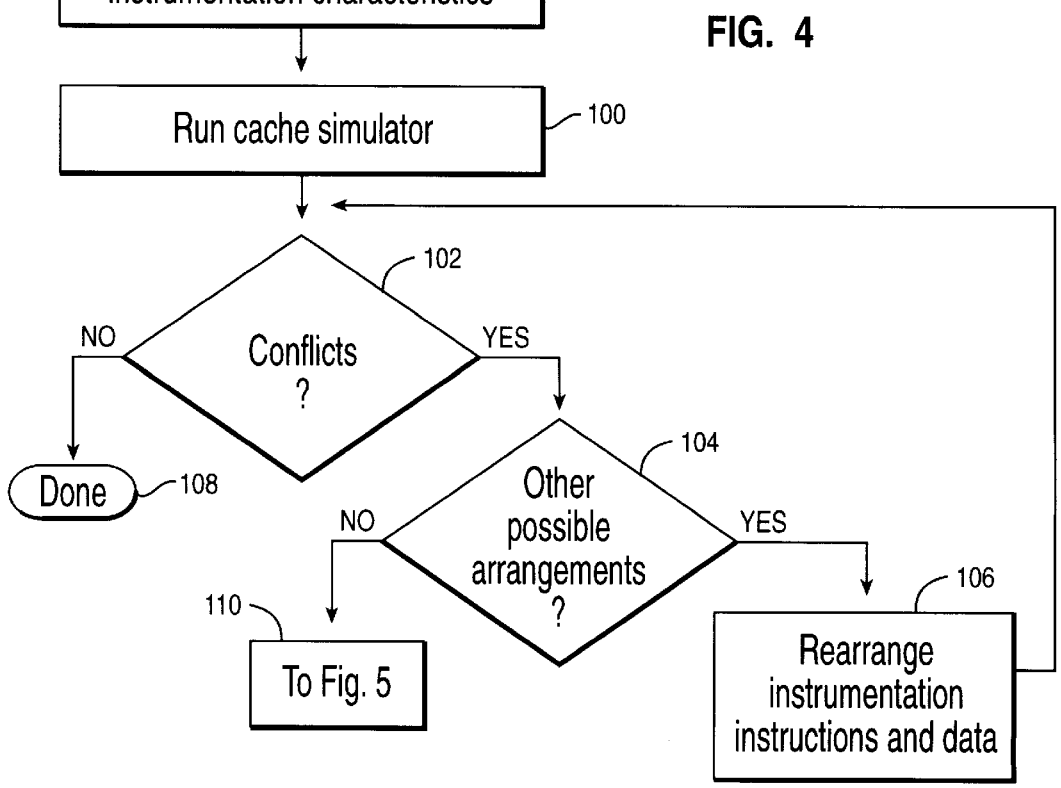
FIG. 4 is a flow chart depicting further details of a method for adding minimally intrusive code and data according to the teachings of the present invention.

Referring now to FIG. 4, a method is shown for implementing the three phases depicted in FIG. 3. In FIG. 4, steps 90, 92, and 94 are part of collection phase 80. Steps 96 through 110 are part of placement phase 82. Instrumentation phase 84 is not depicted in FIG. 4.

As shown in FIG. 4, the workload (i.e. code segment to be monitored) is executed concurrently with a tracing program (step 90). The tracing program collects both instruction cache accesses and data cache accesses for the code segment to be monitored (step 92). This data collection step is highly intrusive in terms of instruction and data caching, but it does not affect the deterministic data (i.e. which cache and data lines are being used by the code segment to be monitored) being collected by the tracing program. The data is then stored for use by a cache simulator (step 94).

A cache simulator is a program that takes trace data and cache geometry as input, and outputs data such as miss rate and hot cache lines. Such a program can be as complex as the actual hardware implementation of the cache or can use heuristic algorithms to obtain estimated results. For example, suppose a developer wishes to obtain the cache miss rate for an n-by-m way set-associative instruction cache. A trace of executed instruction addresses is needed, along with the length of each variable-length instruction. The cache simulator fills in data structures per input, and adjusts the output counters according to state changes. If for example, the next instruction address maps to a data structure that is already filled by a previous instruction, a cache miss counter is incremented and a cache cast-out event occurs. At the end of the simulation, counter data is output, as well as a map of the current data structures representing the cache content. Cache simulators are used in the art to experiment with and test different caching algorithms (e.g. least recently used, first fit, etc.), decide on certain cache geometries, and predict cache performance.

Still referring to FIG. 4, the trace data is then passed to the cache simulator (step 96). The cache geometry and instrumentation code and data segments are also passed to the cache simulator (step 98). The cache geometry includes data such as the size of the cache, associativity (direct-mapped, two-way associative, four-way associative, etc.), the size of the cache lines, and other data. A cache simulator uses trace data and cache geometry to predict where code and data will be placed in the cache when the code segment runs. The cache simulator then executes (step 100), thus determining a possible placement for the instrumentation code and data segments which will minimize cache mapping conflicts. The cache simulator then checks to determine if the cache mapping conflicts have been minimized (step 102). In other words, the cache simulator determines if the cache mapping conflicts are greater than the minimum acceptable conflicts. The minimum acceptable conflicts may be zero, or some other desired conflict level set by a user. If cache mapping conflicts have been minimized, the placement phase is complete (step 108). If not, the cache simulator checks to see if other arrangements are possible (step 104). If other arrangements are possible, the instrumentation code and data segments are rearranged (step 106) and checked again (step 102). Steps 104 and 102 are repeated until cache mapping conflicts are minimized. Once conflicts are minimized, the instrumentation code can be executed along with the code segment to be monitored, and cache miss rates are collected for the workload.

There is always the possibility that cache mapping conflicts can not be minimized to the desired level by the cache simulator. After trying all possible arrangements, it may be determined (in step 104), that no other arrangements are possible. In this case, the method depicted in FIG. 5 (step 110) is used to determine the best possible placement of instrumentation code and data.

Figure 5:
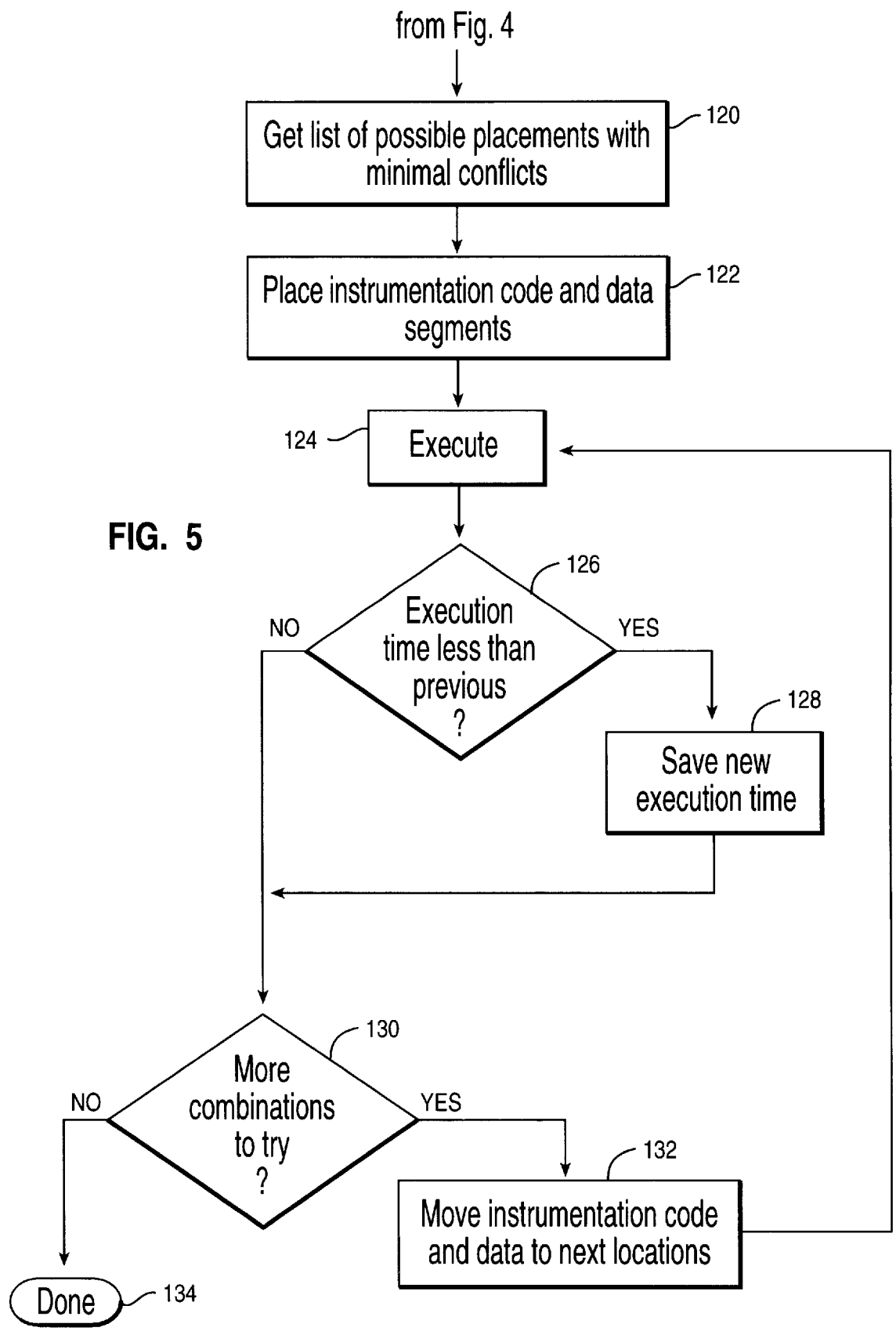
FIG. 5 is a flow chart depicting further details of a method for determining the best possible placement of instrumentation code and data according to the teachings of the present invention.

As shown in FIG. 5, a list of the least intrusive placements (i.e. the placements with the least conflicts) for the instrumentation code and data is obtained from the cache simulator (step 120). The instrumentation code and data are then placed into memory areas according to the list received (step 122). The code under test is then executed (step 124), and the execution time is compared to any previous execution times (step 126). If the execution time is less than any previous execution times, the new execution time is saved (step 128). If there are more memory areas to try (step 130), the instrumentation code and data are moved to the next memory locations (step 132), and the code under test is again executed (step 124). Steps 124 through 132 are repeated until there are no more locations to try (step 130). The placement which resulted in the lowest execution time is assumed to be the optimal placement for the instrumentation code and test.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for dynamically monitoring performance of a code segment executing in an information handling system, said method comprising the steps of:

(a) collecting data regarding the code segment to be monitored;

(b) selecting a final memory placement for one or more instrumentation code segments and one or more instrumentation data segments, wherein the final memory placement includes one or more memory areas in which to place the instrumentation code segments and the instrumentation data segments, and wherein said selecting step includes the steps of:
- (c) choosing a possible memory placement for the instrumentation code segments and the instrumentation data segments;
- (d) determining an effect of one or more external factors based on the possible memory placement;
- (e) if the effect is below a predetermined acceptable level, then setting the final memory placement to the possible memory segment;
- (f) if the effect is not below the predetermined acceptable level, then determining if there are one or more additional possible memory placements;
- (g) if there are additional possible memory placements, then repeating steps (c) through (g) until the effect is below the predetermined acceptable level;
- (h) if there are not additional possible memory placements, then performing the following steps:
  - (i) placing the instrumentation code segments and the instrumentation data segments into one of the possible memory placements determined in step (c);
  - (j) executing the code segment to be monitored;
  - (k) calculating an execution time;
  - (l) repeating steps (i) through (k) for each possible memory placement;
  - (m) setting the final memory placement equal to the possible memory segment which results in a lowest execution time; and
- (n) executing the code segment to be monitored, along with one or more of the instrumentation code segments.

2. A method for dynamically monitoring performance according to claim 1, wherein said collecting step further comprises the steps of:
- tracing the code segment to be monitored; and
- storing the data for use during said selecting step.

3. A method for dynamically monitoring performance according to claim 1, wherein said step of determining an effect of one or more external factors based on the possible memory placement comprises the steps of:
- analyzing a current cache geometry; and
- determining a conflict level.

4. A method for dynamically monitoring performance according to claim 1, wherein said selecting step is performed by a cache simulator.

5. An information handling system, comprising:
- one or more processors, each processor containing a cache memory;
- memory means;
- one or more images of an operating system for controlling the operation of said processors;
- at least one system bus connecting the elements of the system for efficient operation;
- means for collecting data regarding a code segment to be monitored;
- means for selecting a final memory placement for one or more instrumentation code segments and one or more instrumentation data segments, wherein the final memory placement includes one or more memory areas in which to place the instrumentation code segments and the instrumentation data segments, and wherein said means for selecting includes:
  - means for choosing a possible memory placement for the instrumentation code segments and the instrumentation data segments;
  - means for determining an effect of one or more external factors based on the possible memory placement;
  - means for setting the final memory placement to the possible memory placement if the effect is below a predetermined acceptable level;
  - means for determining if there are one or more additional possible memory placements;
  - means for repeatedly choosing the possible memory placement, and for determining the effect of the external factors, until the effect is below the predetermined acceptable level;
  - means for executing the code segment to be monitored, and determining an execution time, for each of the possible memory placements determined by said means for choosing;
  - means for setting the final memory placement equal to the possible memory segment which results in the lowest execution time; and
- means for executing the code segment to be monitored, along with one or more of the instrumentation code segments.

6. An information handling system according to claim 5, wherein said means for collecting further comprises:
- means for tracing the code segment to be monitored; and
- means for storing the data for use by said means for selecting.

7. An information handling system according to claim 5, wherein said means for determining an effect of one or more external factors based on the possible memory placement comprises:
- means for analyzing a current cache geometry; and
- means for determining a conflict level.

8. An information handling system according to claim 5, wherein said means for selecting comprises a cache simulator.

9. A computer program product, in a computer-usable medium, comprising:
- means for collecting data regarding a code segment to be monitored;
- means for selecting a final memory placement for one or more instrumentation code segments and one or more instrumentation data segments, wherein the final memory placement includes one or more memory areas in which to place the instrumentation code segments and the instrumentation data segments, and wherein said means for selecting includes;
  - means for choosing a possible memory placement for the instrumentation code segments and the instrumentation data segments;
  - means for determining an effect of one or more external factors based on the possible memory placement;
  - means for setting the final memory placement to the possible memory placement if the effect is below a predetermined acceptable level;
  - means for determining if there are one or more additional possible memory placements;
  - means for repeatedly choosing the possible memory placement, and for determining the effect of the
- external factors, until the effect is below the predetermined acceptable level;
  - means for executing the code segment to be monitored, and determining an execution time, for each of the possible memory placements determined by said means for choosing;

means for setting the final memory placement equal to the possible memory segment which results in the lowest execution time; and means for executing the code segment to be monitored, along with one or more of the instrumentation code segments.

10. A computer program product according to claim 9, wherein said means for collecting further comprises:

means for tracing the code segment to be monitored; and means for storing the data for use by said means for selecting.

11. A computer program product according to claim 9, wherein said means for determining an effect of one or more external factors based on the possible memory placement comprises:

means for analyzing a current cache geometry; and means for determining a conflict level.

12. A computer program product according to claim 9, wherein said means for selecting comprises a cache simulator program.

* * * * *